(12) United States Patent
Wang et al.

(10) Patent No.: US 12,299,029 B2
(45) Date of Patent: May 13, 2025

(54) VISUAL SEARCH SERVICES FOR MULTIPLE PARTNERS

(71) Applicant: Microsoft Technology Licensing, LLC, Redmond, WA (US)

(72) Inventors: Yan Wang, Mercer Island, WA (US); Houdong Hu, Redmond, WA (US); Li Huang, Sammamish, WA (US); Arun K. Sacheti, Redmond, WA (US); Linjun Yang, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/888,960

(22) Filed: Feb. 5, 2018

(65) Prior Publication Data
US 2019/0243910 A1 Aug. 8, 2019

(51) Int. Cl.
*G06F 16/58* (2019.01)
*G06F 16/2457* (2019.01)
(Continued)

(52) U.S. Cl.
CPC .... *G06F 16/5838* (2019.01); *G06F 16/24578* (2019.01); *G06F 16/51* (2019.01);
(Continued)

(58) Field of Classification Search
CPC .......... G06F 16/5838; G06F 16/24578; G06F 16/51; G06F 16/56; G06F 16/583; G06F 16/5866; G06F 16/587
See application file for complete search history.

(56) References Cited

U.S. PATENT DOCUMENTS 8,356,035 B1 * 1/2013 Baluja .................. G06F 16/583
707/741
8,554,758 B1 10/2013 Larson et al.
(Continued)

OTHER PUBLICATIONS

Yushi Jing, David Liu, Dmitry Kislyuk, Andrew Zhai, Jiajing Xu, Jeff Donahue, Sarah Tavel, Visual Search at Pinterest, KDD '15: Proceedings of the 21th ACM SIGKDD International Conference on Knowledge Discovery and Data Mining, p. 1889-1898 (Year: 2015).*

(Continued)

*Primary Examiner* — Pierre M Vital
*Assistant Examiner* — Andrew N Ho
(74) *Attorney, Agent, or Firm* — CALFEE, HALTER & GRISWOLD LLP

(57) ABSTRACT

Systems and methods can be implemented to conduct a visual search as a service in a variety of applications. In various embodiments, a system is configured to provide searching capabilities of content provided by a first entity in response to a search request by a second entity. An image provided by the second entity can be used by the system as a query image to search the content of the first entity. In an embodiment, the first entity can be a commercial entity providing such a system with image related content regarding its products and services such that any number of individual consumers can search for particular products and services of the commercial entity via their communication enabled devices. In addition, such systems can be arranged for other embodiments to provide customized searches of a single source by many individual devices. Additional systems and methods are disclosed.

20 Claims, 5 Drawing Sheets

(51) Int. Cl.
  *G06F 16/51*  (2019.01)
  *G06F 16/56*  (2019.01)
  *G06F 16/583*  (2019.01)
  *G06F 16/587*  (2019.01)

(52) U.S. Cl.
  CPC ............ *G06F 16/56* (2019.01); *G06F 16/583* (2019.01); *G06F 16/5866* (2019.01); *G06F 16/587* (2019.01)

(56) References Cited

U.S. PATENT DOCUMENTS

| | | | | |
|---|---|---|---|---|
| 2002/0087577 | A1* | 7/2002 | Manjunath | G06F 16/5838 707/999.107 |
| 2002/0091678 | A1* | 7/2002 | Miller | G06F 16/338 |
| 2002/0123994 | A1* | 9/2002 | Schabes | G06F 16/30 707/999.005 |
| 2003/0012428 | A1* | 1/2003 | Syeda-Mahmood | G06F 16/5838 382/162 |
| 2003/0195883 | A1* | 10/2003 | Mojsilovic | G06V 10/40 |
| 2004/0117367 | A1* | 6/2004 | Smith | G06F 16/583 707/999.005 |
| 2005/0091232 | A1* | 4/2005 | Eschbach | G06F 16/58 707/E17.02 |
| 2006/0041613 | A1* | 2/2006 | Fackelmayer | G06F 16/583 707/E17.02 |
| 2006/0106792 | A1* | 5/2006 | Patterson | G06F 16/9535 |
| 2008/0037877 | A1* | 2/2008 | Jia | G06F 16/583 382/224 |
| 2010/0046842 | A1* | 2/2010 | Conwell | H04N 1/00307 382/218 |
| 2011/0078159 | A1* | 3/2011 | Li | G06F 16/24534 707/749 |
| 2011/0125735 | A1* | 5/2011 | Petrou | G06F 16/532 707/723 |
| 2012/0109993 | A1* | 5/2012 | Reznik | G06F 16/583 707/765 |
| 2013/0083999 | A1* | 4/2013 | Bhardwaj | G06K 9/4652 382/165 |
| 2013/0121600 | A1* | 5/2013 | Lin | G06K 9/4676 382/224 |
| 2013/0127893 | A1* | 5/2013 | Gokturk | G06V 10/40 345/589 |
| 2014/0341476 | A1* | 11/2014 | Kulick | G06F 18/24 382/224 |
| 2016/0217157 | A1* | 7/2016 | Shih | G06F 16/5854 |
| 2018/0011876 | A1* | 1/2018 | Li | G06F 16/24575 |
| 2018/0107685 | A1* | 4/2018 | Kale | G06K 9/6269 |
| 2018/0137551 | A1* | 5/2018 | Zheng | G06Q 30/0625 |
| 2018/0157681 | A1* | 6/2018 | Yang | G06F 16/583 |

OTHER PUBLICATIONS

Ge, T., et al., "Optimized Product Quantization for Approximate Nearest Neighbor Search", In Proceedings of IEEE Conference on Computer Vision and Pattern Recognition (CVPR 2013), Jun. 23, 2013, pp. 2496-2953.

Winder, S. A J., et al., "Learning Local Image Descriptors", In Proceedings of IEEE Conference on Computer Vision and Pattern Recognition (CVPR '07), 2007, 8 Pages.

"Microservices—Wikipedia", Retrieved from: https://en.wikipedia.org/w/index.php?title=Microservices&oldid=823579390, Feb. 2, 2018, 6 Pages.

Mohana, et al., "CCBIR: A Cloud Based Implementation of Content Based Image Retrieval", In Journal of WSEAS Transactions on Computers, vol. 14, Dec. 31, 2015, pp. 333-346.

"International Search Report and Written Opinion Issued in PCT Application No. PCT/US2019/015489", Mailed Date: Jul. 16, 2019, 19 Pages.

Wu, et al., "Practical Elimination of Near-Duplicates from Web Video Search", In Proceedings of the 15th International Conference on Multimedia, Sep. 29, 2007, 10 Pages.

Yang, et al., "Visual Search at eBay", In Proceedings of 23rd ACM SIGKDD International Conference on Knowledge Discovery and Data Mining, Aug. 13, 2017, 10 Pages.

* cited by examiner

VISUAL SEARCH SERVICES FOR MULTIPLE PARTNERS

TECHNICAL FIELD

Embodiments described herein generally relate to methods and apparatus related to electronic searching.

BACKGROUND

E-commerce grows with increased capabilities of electronic devices to communicate over networks. Commercial enterprises search for a variety of ways to present their products and services to consumers. The variety of ways includes placing images of their products and services on the Internet, Consumers also search for images of product and services that they desire to acquire by using their electronic devices to view images of products and services. Enhancements in electronic devices or the manner in which the electronic devices interface for both commercial enterprises and consumer user devices may provide for advancements in electronic searching.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Both commercial enterprises and consumers would consider conducting visual searches with respect to products and services of a commercial enterprise in an expedited manner to be advantageous. For example, a department store may want its customer to be able to conduct a limited search only to images within its catalog. In addition, the department store can also benefit from exercising trials on new datasets in agile and convenient manner. An approach to conduct visual searches in an electronic system, as taught herein, can be directed to searches on a limited size rather than an entire index of images associated with the Internet, which may be applied to a variety of electronic-based applications in addition to commercial applications. An index is an auxiliary data structure to support fast retrieval from a database.

In various embodiments, focused searches can be attained using an architecture that can execute a visual search as a service (VaaS) in a system, in which an enterprise provides images to the system over a network along with metadata associated with the images. To provide these images, a list of images with uniform resource locators (URLs) can be transmitted to the system, where the system has components operable to communicate over a network, such as the Internet, to obtain the images. From a user device, a query image can be transmitted to the system, where the query image can be searched within the set of images provided from the enterprise.

In this approach, the system provides a visual search service within the given images for the user. Herein, a query image is an image that is used as a query from a device that inputs the image to a system for the system to operate on the input image to provide a result to the device. The query image can be part of a request to the system for service. The system may be configured for quick deployment and in a manner that allows developers, which use the service, to test new features for products easily. With the system structured in a scalable manner, experiments can be performed on the system that can be used to improve the system.

Figure 1:
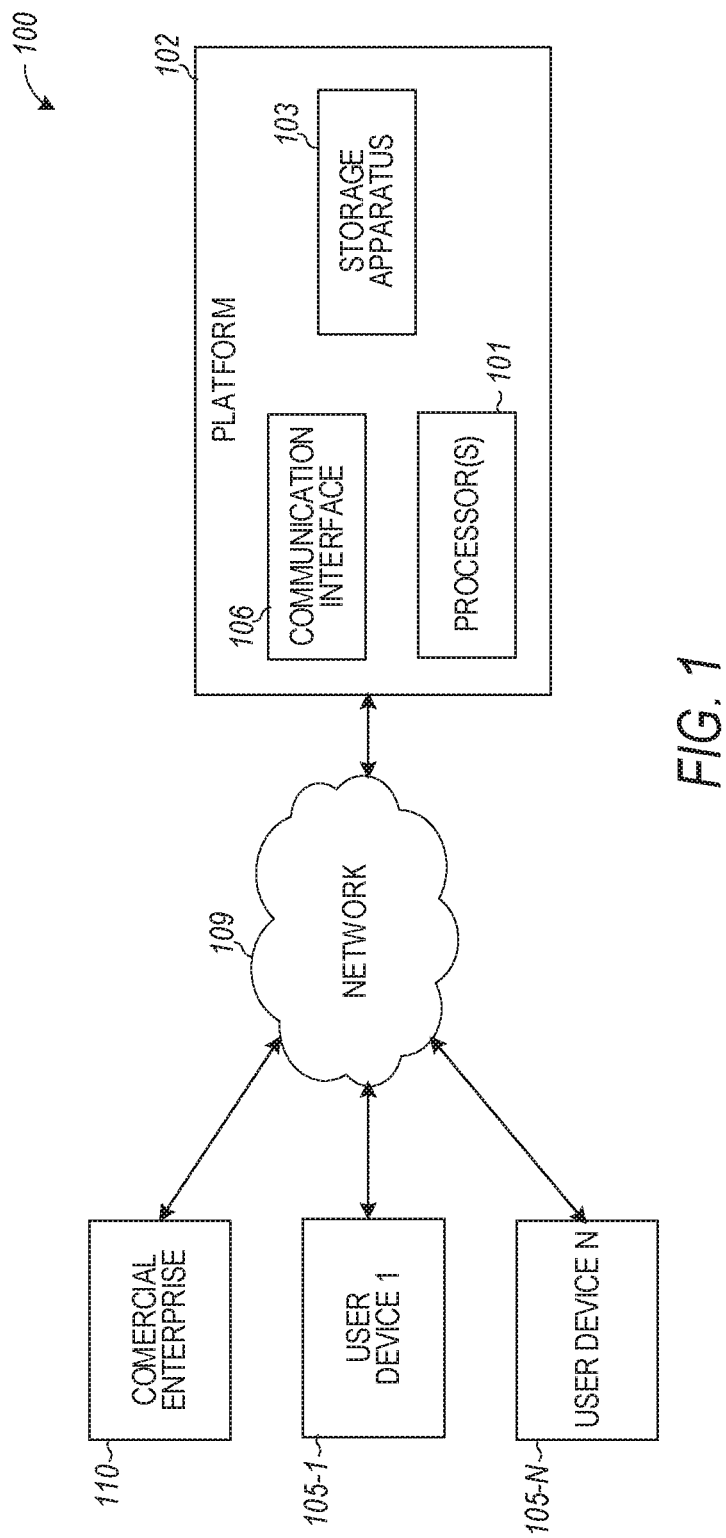
FIG. 1 is a representation of an architecture in which a system, hosted on a platform, is configured to provide visual searches as a service, in accordance with various embodiments.

FIG. 1 is a representation of an architecture 100 in which a system, hosted on a platform 102, is configured to provide visual searches as a service. Architecture 100 includes the platform 102 having a communication interface 106 that can communicate over a network 109 with a commercial enterprise 110 and with user devices 105-1 ... 105-N. Network 109 may be the Internet. Platform 102 has a set of processors 101 that can control functionality of components of platform 102 and execute instructions stored in storage apparatus 103. A platform manager of platform 102 can be realized by the set of processors 101 executing a segment of instructions stored in storage apparatus 103.

Storage apparatus 103 can include instructions, which, when executed by one or more of the processors of the set of processors 101, cause the system, hosted on the platform 102, to perform operations that provide visual searches as a service. The operations can include receiving a set of images and metadata corresponding to the images, where the set originates from a device of a first entity; generating an index from the set; extracting features from the index; receiving a query image and metadata corresponding to the query image, where the query image and metadata originate from a device of a second entity; processing the query image and the to generate a vector representing the query image; performing a search of the features from the index based on the vector; generating a ranking of results of the search using multiple rankers; and returning one or more images to the device of the second entity based on the ranking results. The metadata corresponding to the query image can be category filters, color filters, information from user sensors, for example the geographical location, and other information. The generated index includes data structures built with respect to the set of images for fast operation of the rankers such that final results can be provided in real-time or near real-time.

Other operations performed by execution of instructions in storage apparatus 103 can include receiving test data or changes for the system and distributing the test data or changes among the sections of the system for providing visual searches as a service. In addition, other operations can include collecting data on health of the system and outputting health status to a platform manager of platform 102. In architecture 100, commercial enterprise 110 providing data to the system for providing visual searches as a service may be considered as partners for the visual search service system. The system for providing visual searches as a service can operate in a partnership with more than one commercial enterprise to provide individual visual search services to user devices of users. The users that implement the customized search of one of the commercial enterprises may be different from the users that implement customized searches of the other commercial enterprises.

In various embodiments, platform 102 can be structured in a cloud architecture. Typically, the term "cloud" with respect to data processing and communicating refers to a datacenter full of servers that is connected to the Internet. However, cloud may refer to any network or combinations of networks. A cloud can include a wide area network (WAN) like the public Internet or a private, national or global network, and may include a local area network (LAN) within an organization providing the services of the datacenter. In addition, the term "cloud computing" refers to the software and services executed for users by these servers, and typically the user is unaware of the physical location of the servers or datacenter. Further, the datacenter may be a distributed entity. Cloud computing can provide shared computer processing resources and data to computers and other devices on demand over the associated networks.

Figure 2:
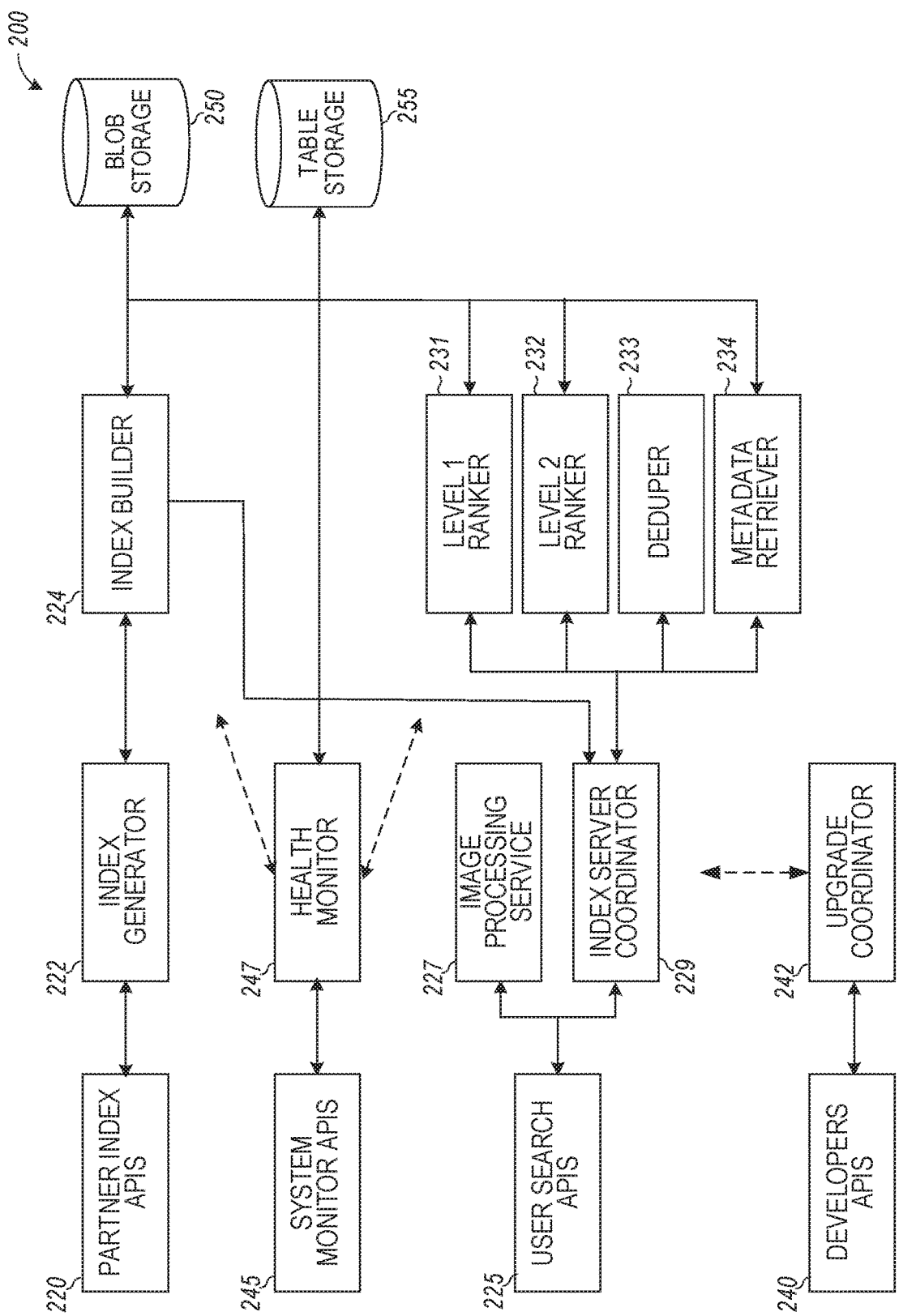
FIG. 2 is a block diagram of a microservice architecture to provide visual searches as a service, in accordance with various embodiments.

FIG. 2 is a block diagram of a microservice architecture 200 to provide visual searches as a service. Microservice architecture 200 implements a visual search pipeline. A microservice architecture structures an application as a collection of coupled services, which implement a number of capabilities. A microservice architecture can enable continuous delivery and deployment of large, complex applications and can enable an organization to evolve its technology stack. Each component of a microservice architecture may be a microservice. Data flow in microservice architecture 200 can be achieved via web calls.

A web call, also referred to as a remote procedure call (RPC) is function that is in contrast with a local function call. A "function" (or "procedure" as referred in older literature) is a basic execution unit. In addition, a function can call another function. In traditional computer programs, both the function being invoked and the function invoking other functions have to be on the same machine. In web calls (RPCs), the invoker function and invoked function can be on different machines. That is, without changing the fundamental programming interface, a microservice architecture allows a function A to call a function B, with function B running on another machine.

Microservice architecture 200 can be implemented on a platform such as platform 102 of FIG. 1. The platform may provide some functions for microservice architecture 200 such as watchdog and status reports, service load dispatching, load balancing, and component upgrading with no-down-time. Load balancing can be used for index updating in microservice architecture 200, and no-down-time component upgrading may be important for index/system updates in microservice architecture 200. Microservice architecture 200 hosted on a platform may be able to scale easily in the future.

Microservice architecture 200 can include four microservices configured as application programming interfaces (APIs). An API is software that allows two applications to communicate with each other. One of the APIs is configured to provide input for partner functions in the visual search service of microservice architecture 200. One of the APIs is configured to provide input for consumer functions in the visual search service of microservice architecture 200 and an output to transmit results to the consumer's user device. One of the APIs is configured to provide output of the status of the microservices of microservice architecture 200. One of the APIs is configured to provide input to test partner activities and to test and upgrade microservices of microservice architecture 200.

Partner index APIs 220 are configured to receive data from entities, referred to as partners, such as but not limited to commercial enterprises, where the data provides content to be searched. Commercial enterprises can include, but are not limited to, a retailer that desires to add visual search support to its inventory by using the service of microservice architecture 200 or similar architectures via a partner index API 220. By engaging in the service of microservice architecture 200 or similar architectures, the retailer becomes a partner to microservice architecture 200 or similar architectures. For multiple partners, each partner provides separate search sources with respect to different visual search services. Each partner index API 220 allows a respective partner to plug in their data to microservice architecture 200 to obtain a visual search engine running in a short time. The data can be general images or specific verticals. Vertical markets are those that focus on a specific niche and can be marketed to in a similar manner. Specific verticals, a short term for vertical markets, for visual searching can be specific types of images. A database and index can be specifically configured for a vertical market, for example but not limited to, fashion images only, dog food images only, or only images of other specific types of products.

The input to a partner index API 220 provides for import and update of batch indexing in microservice architecture 200. Batch indexing is directed to a list of full images and their metadata from the partner to provide an extensive source in which to conduct a visual search. The indexing of the batch content is conducted in microservices of microservice architecture 200 in a dataflow coupled to partner index API 220. Incremental inputs to partner index API 220 can be processed in which only newly added or newly updated images and their metadata are input. Incremental inputs of partner images, metadata, or index update can be accomplished without interrupting the service for consumers to conduct visual searches initially based on the batch index.

Partner index APIs 220 can also interface with a partner system to provide other functions. A partner index API 220 can provide output to a partner system as a thumbnail server that provides images having less than full resolution images. Partner index API 220 can provide output to a partner system to provide de-duplication service that eliminates images that are duplicates of near duplicates of other images in a set of images.

For performing partner related functions, microservice architecture 200 includes two index related microservices, index generator 222 and index builder 224. The input to partner index API 220 is provided to index generator 222, which generates an index from a set of images provided, including collecting associated metadata and similar information. From the index generated by index generator 222, index builder 224 extracts the features to be used in the visual search engine. Examples of extracted features can include deep neural network (DNN) features from various popular networks, such as AlexNet and ZeilerNet. Herein, DNN features refer to a vector produced by DNN, from a given image input to the DNN, to describe the content of the given image. Extracted features can include other visual features that turn an image into a mathematical vector to describe the content of the given image. This feature data can be stored in a blob storage 250.

Blob storage is a storage that can store unstructured data as objects (blobs). Blob storage can store any type of text or binary data, such as a document, media file, or application installer. Blob storage is also referred to as object storage. Arbitrarily large amounts of unstructured data can be stored in blob storage. Blob storage can be configured as a service of a cloud platform, where service to users may be provided, for example, over hypertext transfer protocol (HTTP) and hypertext transfer protocol secure (HTTPS).

For performing consumer related functions, microservice architecture 200 includes microservices: user search APIs 225, image processing service 227, index server coordinator 229, level 1 (L1) ranker 231, level 2 (L2) ranker, deduper 233, and metadata retriever 234. A user search API 225 operates as a visual search API that receives an input image originating from a user device and returns visual search results to a device of the consumer user. Microservice architecture 200 can be constructed such that provision of visual search results can be provided with a reasonable latency from receiving the input image, for example, less than one second. The user device may interface with user search API 225 via a web based application of the user device. The input image is a query image with which to search the index generated with respect to images of a partner system.

The output from user search API 225 can be sent to processing service 227 and to index server coordinator 229. Processing service 227 extracts visual features from the query image and generates a vector representation for the query image. The output of processing service 227 is fed into index server coordinator 229.

Index server coordinator 229 also receives an input from index builder 224. A search of the features from the index from index builder 224 can be performed based on the vector from index server coordinator 229. In addition, index builder 224 can trigger an index update to index server coordinator 229. Index server coordinator 229 can coordinate with a set of rankers to rank these initial search results to send final results to user search APIs 225 for presentation to the user device.

The set of rankers can include four ranking microservices that operate in order: L1 ranker 231, L2 ranker 232, deduper 233, and metadata retriever 234. L1 ranker, L2 ranker, and metadata retriever 234 can receive input from index builder 224, which provides initialization for these rankers or updates of the index being searched. The search results from index server coordinator 229 are operated on by L1 ranker 231 that generates candidates for further ranking. The L1 ranker 231 is limited to the search results from the index provided by index builder 224 with respect to the vector provided by index server coordinator 229. The candidates are ranked by L2 ranker 232. L2 ranker is limited in its ranking to the set of candidates. Thus, the search is focused on the partner provided images and is not an Internet based search.

L1 ranker can be implemented using a product quantization (PQ) technique. In various embodiments, an innovative algorithm, developed by Microsoft Research in collaboration with University of Science and Technology of China, called Optimized Product Quantization is used. For more information, see the paper, "Optimized Product Quantization for Approximate Nearest Neighbor Search" by Tiezheng Ge, Kaiming He, Qifa Ke, and Jian Sun, which paper is incorporated by reference in its entirety. In this approach, an original high-dimensional vector associated with the index is decomposed into many low-dimensional sub-vectors that are then quantized separately. Each sub-vector is quantized into a number with each number from the sub-vector forming a PQ vector that can be compared with the query vector processed from the query image. The comparison can be made as a determination of the distance between the PQ vector and the query vector being within a threshold range.

Another L1 implementation can be based on a KD tree. A KD tree, or K-dimensional tree, is a data structure used for organizing a number of points in a space with K dimensions. It is a binary search tree with other constraints imposed on it. KD trees are very useful for range and nearest neighbor searches. The L2 ranker 232 may be implemented using category matching, color matching, matching face-related features, or matching procedures. Other techniques may be used to implement L1 and L2 rankers.

After the ranking by L2 ranker 232, the results of the ranking by L2 ranker 232 can be operated on by deduper 233. Deduper 233 removes duplicate images from these results. Removing duplicates can also be referred to as deduping. After operation by deduper 233, the ranked results, without duplicates, is operated on by metadata retriever 234 that retrievers and can apply metadata associated with the results. The metadata can be used to filter the results, for example, by category of objects of the image, color, etc. After processing by metadata retriever 234, index server coordinator 229 sends final results to user search APIs 225 for presentation to the user device.

Microservice architecture 200 includes microservices to perform developer oriented tests. Test data provided to microservice architecture 200 can be received at a developers API 240. The developers API 240 provides the test data to a upgrade coordinator 242, where upgrade coordinator 242 is structured as a microservice. Upgrade coordinator 242 distributes the test data among the individual microservices of microservice architecture 200, as indicated by the dashed line shown in FIG. 2. The developers API 240 can return test results to the source of the test data. Changes, from either design changes or from results of testing, can be received at the developers API 240 and provided to upgrade coordinator 242 for distribution of the changes to the appropriate microservices among the individual microservices of microservice architecture 200.

Upgrade coordinator 242 can use APIs providing a framework for microservice architecture 200. The structure of microservice architecture 200 allows developers to perform experiments on small verticals and easily test new features, which may relate to new characteristics. The new characteristics may include characteristics of the images being searched, indexing, variations in image processing, searching by vector, ranking, and other functions associated with providing visual search as service. In addition, testing of individual partners can be performed through developers APIs 240 and upgrade coordinator 242 in which visual features of data can be added or removed.

System monitor APIs 249 can be arranged as microservices to output health status to a platform manager of a platform that hosts microservice architecture 200. The health status can include the health status of microservice architecture 200 and individual microservices of microservice architecture 200. Health status can include data on performance such but not limited to error detection, error correction, rates of operation, loading parameters. System monitor APIs 249 receive the health status from health monitor 247, configured as a microservice of microservice architecture 200. Health monitor 247 interfaces with individual microservices of the microservice architecture 200, as indicated by the dashed lines in FIG. 2, and collects a data on health of individual microservices of the microservice architecture 200. Collected data by health monitor 247 can include data stored in a table storage 255 and health monitor 247 can store data, such as data acquired from the other microservices, in table storage 255.

Microservice architecture 200 can be structured with additional features. It can provide system logging and legal-compliant user logging. De-duplicating of consumer provided query documents can be provided. Another feature is an adult filtering feature, which can be provided as part of an automatic pipeline to determine whether an image has adult content so that return results are not provided with adult or racy content.

Microservice architecture 200 or similar architectures can provide a consumer oriented search as a web based application that can support an instance search. An instance search is a section of general visual search. A general visual search aims at returning images that are visually similar to the query image. An instance search has a more advanced goal, to return the images of the same object that appeared in the query image. Consider the following example illustrating their difference. A photo of Tokyo Tower is input to the system. In the context of a visual search, it is acceptable to return photos of the Eiffel Tower, because they are similar in shape. But it is not acceptable in the context of an instance search, where only photos of Tokyo Tower are treated as correct in the instance search. Microservice architecture 200 or similar architectures can support instance search by using tailored visual features and rankers.

Microservice architecture 200 provides a focused visual search service. As such, it is not a web-scale visual search engine. With respect to images, web-scale is a terminology to describe the number of images. It means that the number of images is comparable to that of all the images on the entire World Wide Web. It is often used in the search engine industry because that is the scale to which general search engines like Bing® or Google® deal. Empirically, when one mentions web-scale images, the number is at a level of tens to hundreds of billions. In various embodiments, data and index with respect to microservice architecture 200 may be contained in one machine, for example, hardware having less than 112 Gb of RAM and 1 T of disk storage. The machine can be larger depending on workstation hardware. In some cases, the system may be directed to work with 40 million images or less.

Figure 3:
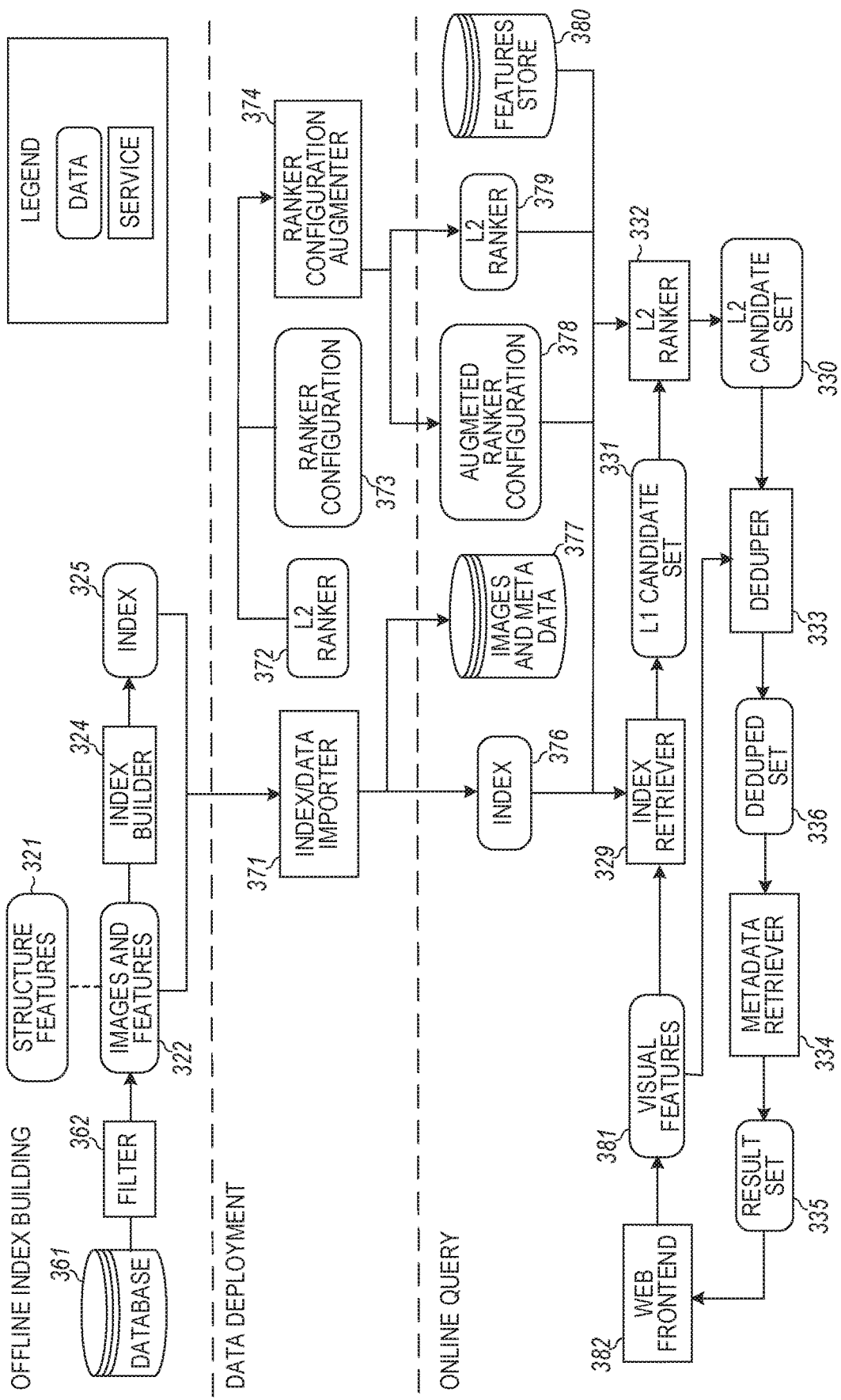
FIG. 3 is a representation of data flows associated with microservice architecture of FIG. 2 in different operational phases, in accordance with various embodiments.

FIG. 3 is a representation of data flows associated with microservice architecture 200 of FIG. 200 in different operational phases. Arrows in FIG. 3 indicate data flow. Microservice architecture 200 effectively operates in three phases: offline index building, data deployment, and online query. In the offline index building phase, data from a database 361 can be operated on by filter service 362 with respect to, but not limited to, such characteristics as what is the use for a product and whether there are adult metawords in the data. From filter service 363, images and features 322 are provided according to structure features 321, which can define a floating point representation for the features. Images and features 322 can be provided as murl strings and purl strings. Murl provides URL pattern matching and replacing. Purl is s persistent URL, which is a type of URL that acts as an intermediary for a real URL of a web resource. The real address of the web page may change, but the PURL remains the same. Images and features 322 are presented to index builder service 324, which in an offline state builds a KD tree of a L1 feature and provides an index 325 as a data file having a KD tree.

In a data deployment phase, a deployer uploads the following files and executes a script with URLs as parameters: images and features 322, index data file 325, L2 ranker initialization file 372, and ranker configuration file 373. From the offline index building phase, images and features 322 and index data file 325 are uploaded to storage for deployment and the URL is submitted to index/data importer 371. The deployer also provides the deployment storage path to a L2 Ranker file. The ranker configuration file 373 can include an L1 feature, L1 result count, and L2 result count. A ranker configuration augmenter 374 parses the L2 ranker and generates the L2 features in the configuration.

In an online query phase, the services are interconnected with API framework+remoting (C# data contract). C# is a programming language and C# data contract is a protocol provided by C# to communicate among different machines. In the context of object oriented programming, a C# class is a class implemented in C#. The interfaces can be constrained by C# classes compiled from bond. Bond is a cross-platform framework for working with schematized data. It supports cross-language de/serialization and powerful generic mechanisms for efficiently manipulating data Backward compatibility can be enforced. Microservice architecture 200, for example, and data flows associated with microservice architecture 200 can be implemented using other programming languages or frameworks.

The databases in the online query phase can use a mongodb or SQL server. Mongodb is a free and open-source cross-platform document-oriented database program. SQL (structured query language) is a domain-specific language used in programming and designed for managing data held in a relational database management system (RDBMS), or for stream processing in a relational data stream management system (RDSMS).

Index/data importer 371 provides the data into the images and metadata database 377. Index/data importer 371 also provides index data file 376 with KD tree on storage and a copy to local nodes during initialization of depending nodes. Ranker configuration augmenter 374 from the data deployment phase provides an augmented ranker configuration 378 having a L1 feature in string format, a L1 result count in integer format, L2 features in string format, and a L2 result count in integer format. Ranker configuration augmenter 374 also provides L2 ranker 379 as an initialization file. The deployer also provides the deployment storage path to a L2 ranker file. Features store 380 includes identifications (IDs) corresponding to feature in memory or a document database.

In the online query phase, a web frontend 382 accepts features as input and outputs results. The output may be returned as a pbxml (platform builder extensible markup language) file of results. Web frontend 382 provides visual features 381 to index retriever 329. Also, input to index retriever 329 includes index 376 data file, augmented ranker configuration 378, and identification features from features store 380. Given a feature and this input, index retriever 329 retrieves L1 results and downloads the index file 376 to a local node when initializing. Index retriever 329 outputs a L1 candidate set 331, which can be IDs only.

L1 candidate set 331 is provided to L2 ranker 332 along with augmented ranker configuration 378, L2 ranker initialization file 379, and IDs from feature store 380. L2 ranker 332 extracts L2 features from the feature store, calculates feature distances, calculates FastRank scores, and sorts according to the scores. FastRank is an efficient implementation of the MART™ gradient boosting algorithm. Gradient boosting is a machine learning technique for regression problems. It builds each regression tree in a step-wise fashion, using a predefined loss function to measure the error for each step and corrects for it in the next.

L2 ranker 332 outputs IDs and T2S2 vectors as L2 candidate set 330. T2S2 is a visual feature that turns an image into a mathematics vector to describe the content of the image. Two images that are very similar usually have very similar T2S2 feature vectors. L2 candidate set 330 is provided to deduper service 333 along with visual features 381. Deduper service 333 performs query deduping and document deduping. Deduped set 336 can be provided to metadata retriever 334, and can be provided as IDs only. Metadata retriever 334 provides result set 335 that be provided as a murl string, a Purl string, or a thumbnail string or combinations thereof. Result set 335 is provided to web frontend 382 for output from the visual search service.

In various embodiments, a microservice architecture that implements a visual search pipeline as a service can be applied to a variety of consumer or e-commerce scenarios. A consumer via a electronic device can engage in doing business with a particular commercial vendor using such a service. With this particular commercial vendor using this service, a consumer can transmit a photo of a product of a desired product to the visual search service along with identification of the commercial vendor. If the commercial vendor has provided content of its products for indexing in the visual search service, the visual search service can conduct a visual search with respect to the input photo, as taught herein, and can provide identification of corresponding products of the particular commercial vendor to the consumer's electronic device. The identification can be accompanied by specific details of the corresponding product and appropriate URLs for the consumer to obtain a product selected from the results of the visual search.

A electronic device of the consumer may include an API that allows the consumer to conduct visual searches of a product among a number of commercial vendors using the visual search service. A communication between the user's electronic device and the visual search service can be generated for a number of separate, independent searches, one for each of the number of commercial vendors, since the visual search service is structured as a customized service. Each of the number of commercial vendors would be a partner relationship with the visual search service to provide the content for the consumer search.

Figure 4:
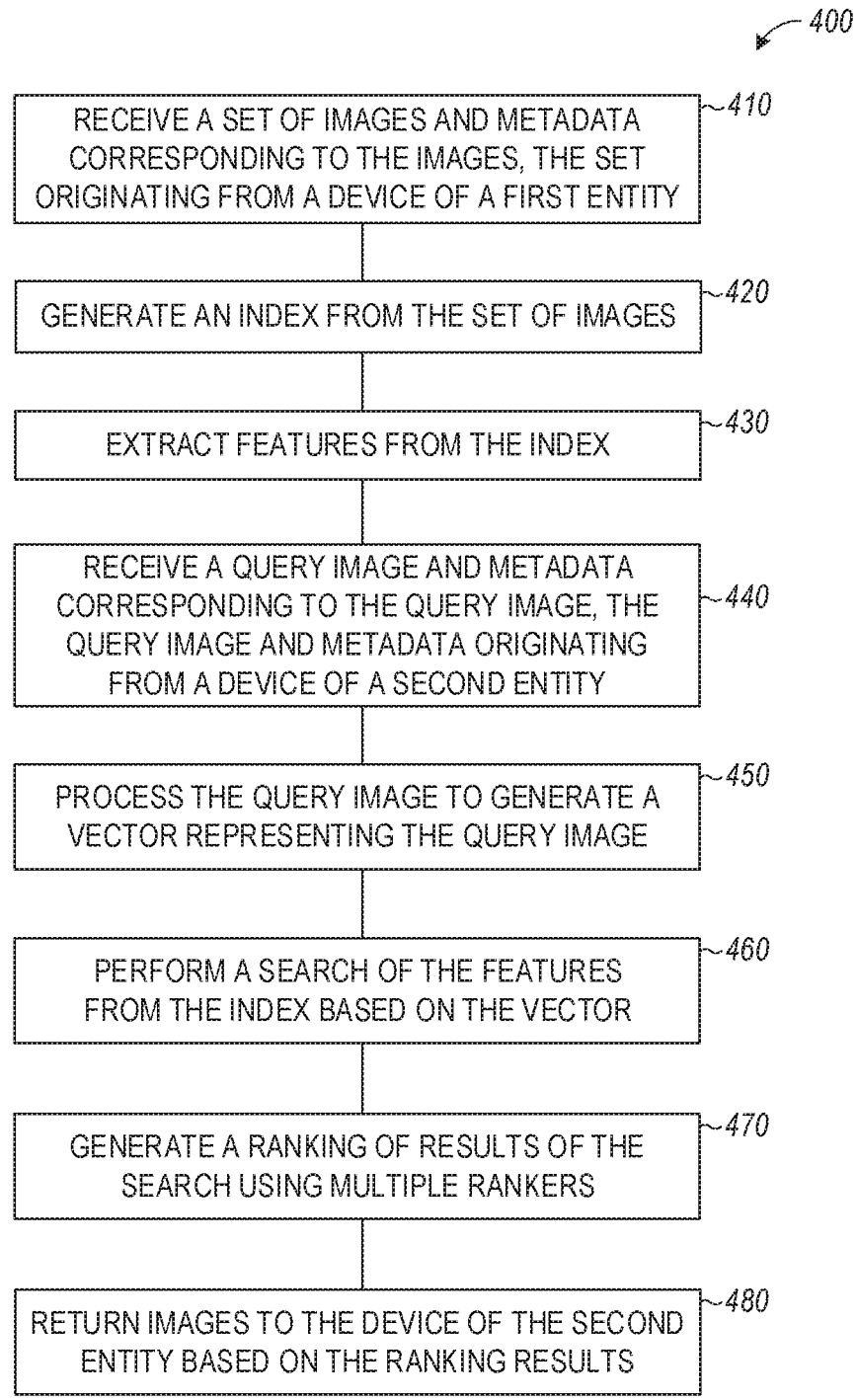
FIG. 4 is a flow diagram of features of an example method of conducting a visual search, in accordance with various embodiments.

FIG. 4 is a flow diagram of features of an embodiment of an example method 400 of conducting a visual search. The features can be conducted based on execution of instructions by one or more processors. At 410, a set of images and metadata corresponding to the images is received, the set originating from a device of a first entity. Receiving the set of images and metadata can include initially receiving a batch of images and at subsequent times receiving incremental amounts of images to include with the previously generated index. At 420, an index is generated from the set. At 430, features are extracted from the index.

At 440, a query image and metadata corresponding to the query image is received, the query image and metadata originating from a device of a second entity. At 450, the query image and the metadata corresponding to the query image can be processed to generate a vector representing the query image. At 460, a search of the features from the index is performed based on the vector. At 470, a ranking of results of the search is generated using multiple rankers. Generating a ranking of results of the search using multiple rankers can include ranking results of the search of the features from the index using a first level ranker to generate first candidates and ranking the first candidates using a second level ranker with application of the second ranker limited to ranking the first candidates.

Method 400 or method similar methods 400 can include removing duplicate images based on results output from ranking the first candidates using a second level ranker; and retrieving metadata associated with results output from ranking the first candidates using a second level ranker. At 480, one or more images are returned to the device of the second entity based on the ranking results. Such methods provide a mechanism to conclude a customized search of a single source with respect to a query image provided by an individual user device. The customized search may be expanded to multiple sources that consolidate their content, effectively forming a single search source.

Variations of method 400 or methods similar to method 400 can include a number of different embodiments that may be combined depending on the application of such methods and/or the architecture of systems in which such methods are implemented. Such methods can include performing the abovementioned actions of method 400, or similar methods, wherein each of receiving the first set of images and metadata, generating the index, extracting the features, receiving the query image, processing the query image, performing the search, and generating the ranking are performed as separate individual microservices of a microservice architecture. Returning one or more images to the device of the second entity based on the ranking results can be conduct as part of the microservice of the microservice to receive the query image. Such methods can include: receiving, in an application programming interface configured as a microservice of the microservice architecture, testing data or changes to the microservice architecture; providing the testing data or changes to an upgrade coordinator, the upgrade coordinator structured as a microservice of the microservice architecture; and distributing, from the upgrade coordinator, the testing data or changes among the individual microservices of the microservice architecture. Such methods can include collecting, in a health monitor microservice, data on health of the microservices of the microservice architecture; receiving, in a system monitor application programming interface configured as a microservice of the microservice architecture, health status from the health monitor microservice; and outputting the health status from the system monitor application programming interface to a platform manager of a platform that hosts the microservice architecture.

Elements associated with the architectures, as taught herein, may communicate over a network. The network may include local-area networks (LAN), wide-area networks (WAN), wireless networks (e.g., a IEEE 802.11 wireless local area network or a cellular wireless wide area network), the Public Switched Telephone Network (PSTN) network, ad hoc and device-to-device (D2D) networks, personal area networks (e.g., Bluetooth) or other combinations or permutations of network protocols and network types. The networks may include a single local area network (LAN), a wide-area network (WAN), or a combination of LANs and/or WANs, such as the Internet. The various devices coupled to network may be coupled to the network via one or more wired or wireless connections.

Embodiments described herein may be implemented in one or a combination of hardware, firmware, and software. Embodiments may also be implemented as instructions stored on one or more machine-readable storage devices, which may be read and executed by at least one processor to perform the operations described herein. A machine-readable storage device may include any non-transitory mechanism for storing information in a form readable by a machine, for example, a computer. For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, or mechanisms. Components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In an example, the software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform one or more methodologies described herein.

In various embodiments, a machine-readable storage device comprises instructions stored thereon, which, when executed by a set of processors of a system, cause the system to perform operations, the operations comprising one or more features similar to or identical to features of methods and techniques described with respect to method 400, variations thereof, and/or features of other methods taught herein. The physical structures of such instructions may be operated on by the set of processors, which set can include one or more processors. Executing these physical structures can cause the machine to perform operations comprising operations to: receive a first set of images and metadata corresponding to the images, the first set originating from a device of a first entity; generate an index from the first set; extract features from the index; receive a query image and metadata corresponding to the query image, the query image and metadata originating from a device of a second entity; process the query image and the metadata corresponding to the query image to generate a vector representing the query image; perform a search of the features from the index based on the vector; generate a ranking of results of the search using multiple rankers; and return one or more images to the device of the second entity based on the ranking results.

Variations of the abovementioned machine-readable storage device or similar machine-readable storage devices can include a number of different embodiments that may be combined depending on the application of such machine-readable storage devices and/or the architecture of systems in which such machine-readable storage devices are implemented. Such machine-readable storage device can further include instructions wherein each of the instructions to receive the set of images and metadata, generate the index, extract the features, receive the query image, process the query image, perform the search, and generate the ranking are performed as separate individual microservices of a microservice architecture.

Such instructions can further include instructions to: receive, in an application programming interface configured as a microservice of the microservice architecture, testing data or changes to the microservice architecture; provide the testing data or changes to an upgrade coordinator, the upgrade coordinator structured as a microservice of the microservice architecture; and distribute, from the upgrade coordinator, the testing data or changes among the individual microservices of the microservice architecture.

Such instructions can include instructions to: collect, in a health monitor microservice, data on health of the microservices of the microservice architecture; receive, in a system monitor application programming interface configured as a microservice of the microservice architecture, health status from the health monitor microservice; and output the health status from the system monitor application programming interface to a platform manager of a platform that hosts the microservice architecture.

In various embodiments, a system to conduct a visual search can comprise a set of processors and a storage apparatus comprising instructions, which, when executed by the set of processors, cause the system to perform operations. The operations can include operations to: receive a first set of images and metadata corresponding to the images, the first set originating from a device of a first entity; generate an index from the first set; extract features from the index; receive a query image and metadata corresponding to the query image, the query image and metadata originating from a device of a second entity; process the query image and the metadata corresponding to the query image to generate a vector representing the query image; perform a search of the features from the index based on the vector; generate a ranking of results of the search using multiple rankers; and return one or more images to the device of the second entity based on the ranking results. The system can be arranged for the first entity being a commercial enterprise, the second entity being a consumer, and the first set of images and metadata being associated with products or services of the first entity. In other embodiments, the system can be arranged to provide visual searches as a service for end users to have a customized visual search of content provided by a specific source for the content.

Variations of a system related to conducting a visual search, as taught herein, can include a number of different embodiments that may be combined depending on the application of such systems and/or the architecture in which systems are implemented. The operations of such a system can include operations with the system in which the instructions include instructions to perform the abovementioned operations structured as part of a microservice architecture. The microservice architecture can include an application programming interface configured to receive testing data or changes to the microservice architecture and provide the testing data or changes to an upgrade coordinator, the upgrade coordinator structured as a microservice of the microservice architecture configured to distribute the testing data or changes among the individual microservices of the microservice architecture. The microservice architecture can include a health monitor microservice configured to collect data on health of individual microservices of the microservice architecture; and a system monitor application programming interface configured to receive health status from the health monitor microservice and to output the health status to a platform manager of a platform that hosts the microservice architecture.

In the embodiment of the system having a microservice architecture, the multiple rankers can include a first level ranking microservice and a second level ranking microservice configured such the first level ranking microservice operates on inputs from results of the search of the features from the index to generate first candidates and the second level ranking microservice is configured to limit ranking to the first candidates. The microservice architecture can also include a microservice to remove duplicate images based on results output from the second level ranking microservice. In addition, the microservice architecture can include a microservice to retrieve metadata associated with results output from the second level microservice. The microservice architecture can be configured with data flow in the microservice architecture achieved via web calls.

Figure 5:
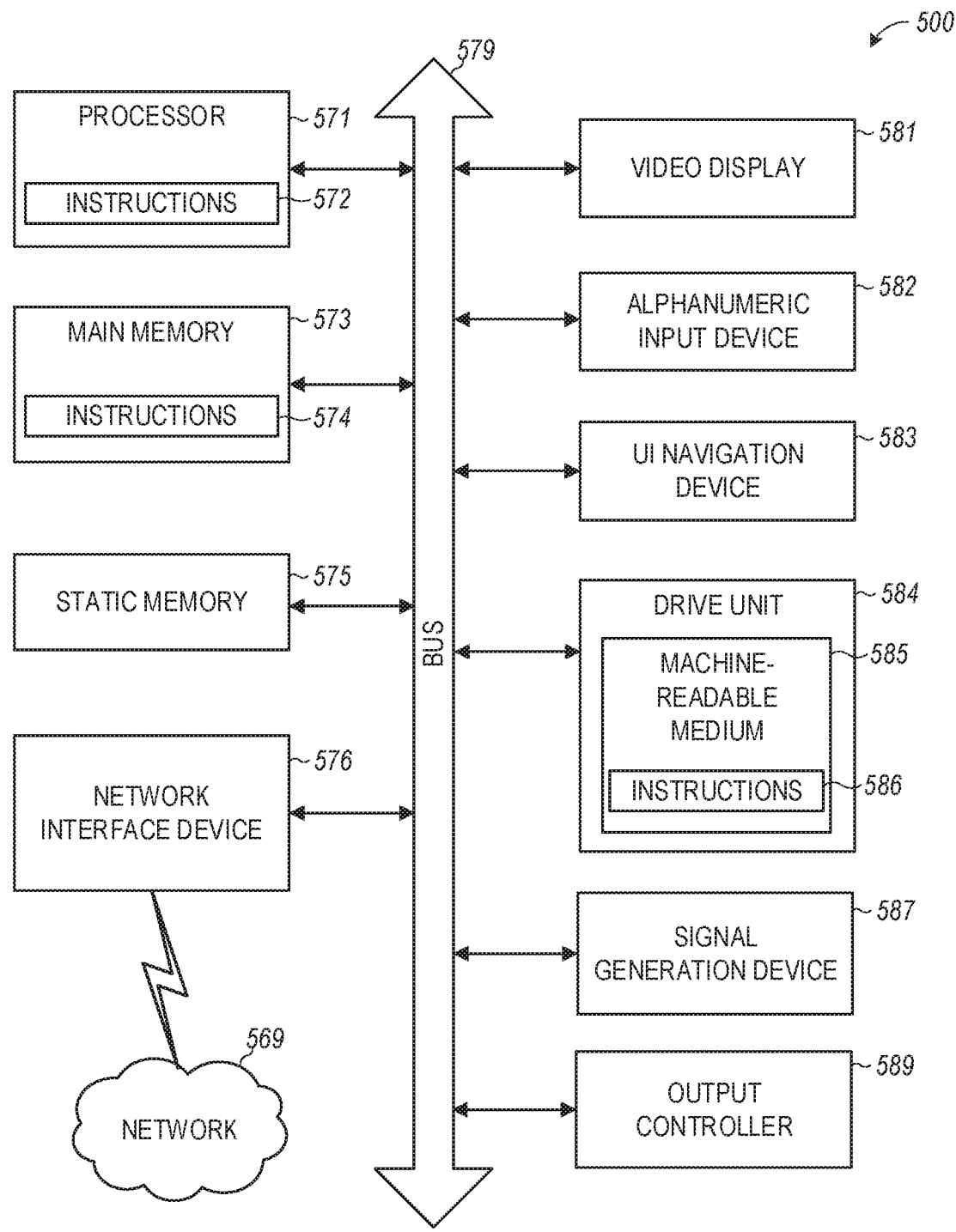
FIG. 5 is a block diagram illustrating features of an example system, within which a set or sequence of instructions may be executed to cause the system to perform any one of the methodologies discussed herein, in accordance with various embodiments.

FIG. 5 is a block diagram illustrating features of an embodiment of an example system 500, within which a set or sequence of instructions may be executed to cause the system to perform any one of the methodologies discussed herein. System 500 represents one or more machines associated with an image search and architectures, as taught herein. System 500 may be a machine that operates as a standalone device or may be networked to other machines. In a networked deployment, the system 500 may operate in the capacity of either a server or a client machine in server-client network environments, or it may act as a peer machine in peer-to-peer (or distributed) network environments. Further, while system 500 is shown only as a single machine, the term "system" shall also be taken to include any collection of machines that individually or jointly execute a set (or multiple sets) of instructions to perform any one or more of the methodologies discussed herein.

System 500 can include one or more processors 571, a main memory 573 and a static memory 577, which communicate with each other via a link 579 (e.g., a bus). System 500 may further include a video display unit 581, an alphanumeric input device 582 (e.g., a keyboard), and a user interface (UI) navigation device 583 (e.g., a mouse). Video display unit 581, alphanumeric input device 582, and UI navigation device 583 may be incorporated into a touch screen display. A UI of system 500 can be realized by a set of instructions that can be executed by processor 571 to control operation of video display unit 581, alphanumeric input device 582, and UI navigation device 583. The UI can control real-time image searches embedded in instructions in components of system 500.

System 500 may additionally include a storage device 584 (e.g., a drive unit), a signal generation device 587 (e.g., a speaker), a network interface device 576, and one or more sensors (not shown), such as a global positioning system (GPS) sensor, compass, accelerometer, or other sensor. System 500 may also include an audio device 589 having an audio input, such as for example a microphone, and an audio output, such as for example a speaker. The communications may be provided using link 579 in a wired transmission or a wireless transmission.

Storage device 584 can include a machine-readable medium 585 on which is stored one or more sets of data structures and instructions 586 (e.g., software) embodying or utilized by any one or more of the methodologies or functions described herein. The instructions 586 may also reside, completely or at least partially, within the main memory 573, static memory 575, and/or within the processors 571 during execution thereof by system 500, with main memory 573, static memory 575, and processors 571 also constituting machine-readable media. Components of image searching and associated architecture, as taught herein, can be distributed as modules having instructions in one or more of the machine-readable medium 585, main memory 573, static memory 575, and/or within the processors 571 during execution thereof by system 500.

While the machine-readable medium 585 is illustrated in an example embodiment to be a single medium, the term "machine-readable medium" may include a single medium or multiple media (e.g., a centralized or distributed database, and/or associated caches and servers) that store the one or more instructions 586. The term "machine-readable medium" shall also be taken to include any tangible medium that is capable of storing instructions for execution by the machine and that cause the machine to perform any one or more of the methodologies taught herein or that is capable of storing data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 586 may further be transmitted or received over a communications network 569 using a transmission medium via the network interface device 576 utilizing any one of a number of well-known transfer protocols (e.g., HTTP). In addition, communications network 569 may operably include a communication channel propagating messages between entities for which a query image can be transmitted and results of searching on the query image can be transmitted back to the source that transmitted the query image. Further, communications network 569 may operably include a communication channel propagating messages between entities in which one entity provides content for searching and the other entity conducts visual searches of the content in response to requests from other entities, providing a customized search capability. Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any medium that is capable of carrying messages or instructions for execution by a machine, and includes digital or analog communications signals.

In various embodiments, systems and methods provide visual search services in a customized manner. The customization can include using one effective source of content to be searched. The content is transmitted by an entity, such as a commercial entity or other organization, to such a system. The entity providing the content can provide images, a list of images and URLs along with metadata to the system. The system has communication interfaces for a number of entities, such as consumers of products or services, to transmit, via communication enabled devices, a request to the system to search the content based on a query image. The system may be configured with a microservice architecture, but is not limited to a structure having a microservice architecture.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system for visual search, the system comprising:
   a set of processors;
   a storage apparatus comprising instructions, which, when executed by the set of processors, cause the system to perform operations to:
   receive, from a device under control of a first entity, a first set of images and metadata corresponding to the images of the first set of images;
   receive, from a device under control of a second entity, a second set of images and metadata corresponding to the images of the second set of images;
   index the first set of images without referencing images of the second set of images to create a first index, such that the first index is associated with the first entity and not the second entity;
   index the second set of images without referencing images of the first set of images to create a second index, such that the second index is associated with the second entity and not the first entity;
   receive, from an application associated with the first entity, a query image, an identifier for the first entity, and metadata corresponding to the query image, wherein the query image, the identifier for the first entity, and the metadata originate from a device operated by a user;
   generate a vector representing the query image based upon the query image and the metadata corresponding to the query image;
   perform a search of the first index and not the second index based upon the vector and the identifier for the first entity;
   generate a ranking of results of the search using multiple rankers; and
   return, via the application associated with the first entity, one or more images from the first index to the device operated by the user based on the ranking of the results of the search.

2. The system of claim 1, wherein the instructions to perform the operations are structured as part of a microservice architecture.

3. The system of claim 2, wherein the microservice architecture includes an application programming interface configured to:
   receive testing data or changes to the microservice architecture; and
   provide the testing data or changes to an upgrade coordinator, the upgrade coordinator structured as a microservice of the microservice architecture configured to distribute the testing data or changes among individual microservices of the microservice architecture.

4. The system of claim 2, wherein the microservice architecture includes:
   a health monitor microservice configured to collect data on health of individual microservices of the microservice architecture; and
   a system monitor application programming interface configured to receive health status from the health monitor microservice and to output the health status to a platform manager of a platform that hosts the microservice architecture.

5. The system of claim 2, wherein the multiple rankers include a first level ranking microservice and a second level ranking microservice configured such the first level ranking microservice operates on inputs from results of the search of the first index to generate first candidates and the second level ranking microservice is configured to limit ranking to the first candidates.

6. The system of claim 5, wherein the microservice architecture includes a microservice to remove duplicate images based on results output from the second level ranking microservice.

7. The system of claim 5, wherein the microservice architecture includes a microservice to retrieve metadata associated with results output from the second level ranking microservice.

8. The system of claim 2, wherein the microservice architecture is configured with data flow in the microservice architecture achieved via web calls.

9. The system of claim 1, wherein the first entity is a first commercial enterprise, wherein the second entity is a second commercial enterprise, and further wherein the first set of images and metadata are associated with products or services of the first entity, and still further wherein the user is a consumer.

10. A processor implemented method for visual search, the method comprising:
    receiving, from a device under control of a first entity, a first set of images and metadata corresponding to the first set of images;
    receiving, from a device under control of a second entity, a second set of images and metadata corresponding to the second set of images;
    indexing the first set of images without referencing images of the second set of images to create a first index, such that the first index is associated with the first entity and not the second entity;
    indexing the second set of images without referencing images of the first set of images to create a second index, such that the second index is associated with the second entity and not the first entity;
    receiving, from an application associated with the first entity, a query image, an identifier for the first entity, and metadata corresponding to the query image, wherein the query image, the identifier for the first entity, and the metadata originate from a device operated by a user;
    generating a vector representing the query image based upon the query image and the metadata corresponding to the query image;
    performing a search of the first index and not the second index based uponen the vector and the identifier for the first entity;

generating a ranking of results of the search using multiple rankers; and returning, via the application associated with the first entity, one or more images from the first index to the device operated by the user based on the ranking of the results of the search.

11. The processor implemented method of claim 10, wherein each of receiving the first set of images and metadata, receiving the second set of images and metadata, generating the first index, generating the second index, receiving the query image, generating the vector, selecting the first index, performing the search, and generating the ranking of the results are performed as separate individual microservices of a microservice architecture.

12. The processor implemented method of claim 11, wherein the method further includes:

receiving, in an application programming interface configured as a microservice of the microservice architecture, testing data or changes to the microservice architecture;

providing the testing data or changes to an upgrade coordinator, the upgrade coordinator structured as a microservice of the microservice architecture; and distributing, from the upgrade coordinator, the testing data or changes among the individual microservices of the microservice architecture.

13. The processor implemented method of claim 11, wherein the method further includes:

collecting, in a health monitor microservice, data on health of the microservices of the microservice architecture;

receiving, in a system monitor application programming interface configured as a microservice of the microservice architecture, health status from the health monitor microservice; and outputting the health status from the system monitor application programming interface to a platform manager of a platform that hosts the microservice architecture.

14. The processor implemented method of claim 10, wherein generating the ranking of the results of the search using multiple rankers includes ranking the results of the search of the first index using a first level ranker to generate first candidates and ranking the first candidates using a second level ranker with application of the second level ranker limited to ranking the first candidates.

15. The processor implemented method of claim 14, wherein the method further includes:

removing duplicate images based on results output from ranking the first candidates using the second level ranker; and retrieving metadata associated with results output from ranking the first candidates using the second level ranker.

16. The processor implemented method of claim 10, wherein receiving the first set of images and metadata includes initially receiving a batch of images and at subsequent times receiving incremental amounts of images to include with the previously generated first index.

17. A non-transitory machine-readable storage device comprising instructions, which when executed by a set of processors, cause a system to perform operations, the operations comprising:

provide a first set of partner application programming interfaces (APIs) for a first entity and a second set of partner APIs for a second entity;

receive, from a device under control of the first entity and via the first set of partner APIs, a first set of images and metadata corresponding to the images of the first set of images;

receive, from a device under control of the second entity and via the second set of partner APIs, a second set of images and metadata corresponding to the images of the second set of images;

index the first set of images without referencing images of the second set of images to create a first index, such that the first index is associated with the first entity and not the second entity;

index the second set of images without referencing images of the first set of images to create a second index, such that the second index is associated with the second entity and not the first entity;

receive, from an application associated with the first entity, a query image, an identifier for the first entity, and metadata corresponding to the query image, wherein the query image, the identifier for the first entity, and the metadata originate from a device operated by a user;

generate a vector representing the query image based upon the query image and the metadata corresponding to the query image;

perform a search of the first index and not the second index based upon the vector and the identifier for the first entity;

generate a ranking of results of the search using multiple rankers; and return, via the application associated with the first entity, one or more images from the first index to the device operated by the user based on the ranking of the results of the search.

18. The machine-readable storage device of claim 17, wherein each of receive the first set of images and metadata, receive the second set of images and metadata, generate the first index, generate the second index, receive the query image, generate the vector, select the first index, perform the search, and generate the ranking are performed as separate individual microservices of a microservice architecture.

19. The machine-readable storage device of claim 18, wherein the operations further include:

receive, in an application programming interface configured as a microservice of the microservice architecture, testing data or changes to the microservice architecture;

provide the testing data or changes to an upgrade coordinator, the upgrade coordinator structured as a microservice of the microservice architecture; and distribute, from the upgrade coordinator, the testing data or changes among the individual microservices of the microservice architecture.

20. The machine-readable storage device of claim 18, wherein the operations further include:

collect, in a health monitor microservice, data on health of the microservices of the microservice architecture;

receive, in a system monitor application programming interface configured as a microservice of the microservice architecture, health status from the health monitor microservice; and output the health status from the system monitor application programming interface to a platform manager of a platform that hosts the microservice architecture.

* * * * *